United States Patent
Imbimbo et al.

(10) Patent No.: US 12,034,857 B2
(45) Date of Patent: Jul. 9, 2024

(54) VERIFICATION OF LAWFUL INTERCEPTION DATA

(71) Applicant: TELEFONAKTIEBOLAGET LM ERICSSON (PUBL), Stockholm (SE)

(72) Inventors: Amedeo Imbimbo, Caivano (IT); Laura Pappacena, Sarno (IT); Pompeo Santoro, Farsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 705 days.

(21) Appl. No.: 17/259,971

(22) PCT Filed: Jul. 13, 2018

(86) PCT No.: PCT/SE2018/050766
§ 371 (c)(1),
(2) Date: Jan. 13, 2021

(87) PCT Pub. No.: WO2020/013742
PCT Pub. Date: Jan. 16, 2020

(65) Prior Publication Data
US 2021/0288813 A1    Sep. 16, 2021

(51) Int. Cl.
*H04L 9/32* (2006.01)
*H04L 9/00* (2022.01)
*H04L 9/40* (2022.01)

(52) U.S. Cl.
CPC .......... *H04L 9/3236* (2013.01); *H04L 9/3247* (2013.01); *H04L 63/306* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 6,678,270 B1 * | 1/2004 | Garfinkel | H04L 67/146 713/153 |
| 10,299,128 B1 * | 5/2019 | Suthar | H04L 9/30 |

(Continued)

FOREIGN PATENT DOCUMENTS

| | | | |
|---|---|---|---|
| WO | 2014077748 A1 | 5/2014 | |
| WO | WO-2019204860 A1 * | 10/2019 | |

OTHER PUBLICATIONS

Morshed; Voice over IP and Lawful Intercept; Master of Science Thesis Stockholm, Sweden 2010; msjmo@kth.se; downloaded from google scholar (Year: 2010).*

(Continued)

*Primary Examiner* — Kambiz Zand
*Assistant Examiner* — Mahabub S Ahmed
(74) *Attorney, Agent, or Firm* — PATENT PORTFOLIO BUILDERS PLLC (57) ABSTRACT

A permissioned blockchain is used in a lawful interception, LI, context. Participants include a law enforcement agency, LEA, function, a LI mediation and delivery function, MF/DF, and an intercepting network function. A smart contract registered in the blockchain includes conditions associated with intercept related information, IRI, and/or communication content, CC, transactions. Registration is made in the blockchain of IRI and/or CC transactions performed by the participants during LI of a communication between two entities in a telecommunication network. The registered IRI and/or CC transactions are propagated among the participants and the smart contract is executed to verify whether or not the registered IRI and/or CC transactions are compliant with the smart contract. The participants are then informed about whether or not the registered IRI and/or CC transactions are compliant with the smart contract.

17 Claims, 9 Drawing Sheets

(56) References Cited

U.S. PATENT DOCUMENTS

| | | | | |
|---|---|---|---|---|
| 10,491,376 | B1* | 11/2019 | Suthar | H04L 63/102 |
| 10,536,445 | B1* | 1/2020 | Lerner | H04L 63/0428 |
| 10,673,617 | B1* | 6/2020 | Antoniou | G06F 13/4282 |
| 2002/0150096 | A1* | 10/2002 | Sjoblom | H04M 3/2281 |
| | | | | 370/389 |
| 2005/0063544 | A1* | 3/2005 | Uusitalo | H04L 63/306 |
| | | | | 380/277 |
| 2009/0097420 | A1* | 4/2009 | Chiang | H04L 63/306 |
| | | | | 370/259 |
| 2009/0254650 | A1* | 10/2009 | Sheppard | H04L 63/30 |
| | | | | 709/224 |
| 2011/0096669 | A1* | 4/2011 | Iovieno | H04W 8/02 |
| | | | | 370/328 |
| 2014/0325672 | A1* | 10/2014 | Galwas | H04W 12/80 |
| | | | | 726/27 |
| 2014/0380056 | A1* | 12/2014 | Buckley | H04M 3/2281 |
| | | | | 713/171 |
| 2015/0009864 | A1* | 1/2015 | Kim | H04M 3/2281 |
| | | | | 370/259 |
| 2015/0341392 | A1* | 11/2015 | Marfia | H04L 63/306 |
| | | | | 370/259 |
| 2016/0006713 | A1* | 1/2016 | Holtmanns | H04L 63/0428 |
| | | | | 713/168 |
| 2016/0112261 | A1* | 4/2016 | Amato | H04L 63/306 |
| | | | | 709/220 |
| 2017/0287593 | A1* | 10/2017 | Ovalle | G07F 17/3223 |
| 2018/0096752 | A1* | 4/2018 | Ovalle | H01B 3/46 |
| 2018/0123882 | A1* | 5/2018 | Anderson | H04L 43/16 |
| 2018/0150799 | A1* | 5/2018 | Hunt | G06Q 20/223 |
| 2018/0261307 | A1* | 9/2018 | Couse | H04L 63/0428 |
| 2018/0295556 | A1* | 10/2018 | Baek | H04W 8/26 |
| 2018/0337771 | A1* | 11/2018 | Baker | H04L 9/3236 |
| 2019/0036887 | A1* | 1/2019 | Miller | G07C 9/20 |
| 2019/0044917 | A1* | 2/2019 | Mork | H04L 63/0428 |
| 2019/0132350 | A1* | 5/2019 | Smith | G06F 21/60 |
| 2019/0180284 | A1* | 6/2019 | Buch | G06V 40/172 |
| 2019/0213182 | A1* | 7/2019 | Rapanen | H04L 9/3297 |
| 2019/0287325 | A1* | 9/2019 | Paolo | H04L 9/0637 |
| 2019/0311147 | A1* | 10/2019 | Gollogly | H04L 9/50 |
| 2019/0349203 | A1* | 11/2019 | Scherrer | H04L 9/3239 |
| 2019/0349343 | A1* | 11/2019 | Gollogly | G06F 21/6218 |
| 2019/0379642 | A1* | 12/2019 | Simons | H04L 63/0281 |
| 2019/0379664 | A1* | 12/2019 | Suthar | H04L 9/3239 |
| 2019/0380031 | A1* | 12/2019 | Suthar | H04W 60/00 |
| 2019/0392164 | A1* | 12/2019 | Dutta | H04L 9/0825 |
| 2020/0007311 | A1* | 1/2020 | Oberhofer | H04L 63/102 |
| 2020/0089895 | A1* | 3/2020 | Gollogly | G06F 16/1865 |
| 2020/0118127 | A1* | 4/2020 | Miller | G06Q 20/308 |
| 2020/0267163 | A1* | 8/2020 | Wilson | H04L 9/3271 |
| 2020/0366493 | A1* | 11/2020 | Sood | H04L 63/0272 |
| 2021/0083872 | A1* | 3/2021 | Desmarais | G06F 21/74 |
| 2021/0279808 | A1* | 9/2021 | Bryant | H04L 67/12 |
| 2022/0050921 | A1* | 2/2022 | LaFever | H04L 63/20 |
| 2023/0230456 | A1* | 7/2023 | Ovalle | H04L 67/02 |
| | | | | 463/42 |

OTHER PUBLICATIONS

3rd Generation Partnership Project; Technical Specification Group Services and System Aspects; Security; Lawful Interception requirements (Release 15), 3GPP Standard; Technical Specification; 3GPP DTS 33.126, 3rd Generation Partnership Project (3GPP), Mobile Competence Centre ; 650, Route Des Lucioles ; F-06921 Sophia-Antipolis Cedex ; France, vol. SA WG3, No. V0.0.5, Nov. 7, 2017 (Nov. 7, 2017), pp. 1-38, XP051450252.

Dean Bubley "Blockchain & Distributed Ledgers," Disruptive Analysis Ltd, Aug. 31, 2017 (Aug. 31, 2017), pp. 1-12, XP055574781.

International Search Report/Written Opinion dated Apr. 4, 2019 in related/corresponding PCT Application No. PCT/SE2018/050766.

* cited by examiner

VERIFICATION OF LAWFUL INTERCEPTION DATA

TECHNICAL FIELD

Embodiments herein relate to methods of managing lawful interception (LI) data, and corresponding entities, in a telecommunication network and a computer system as well as computer programs and carriers of such computer programs.

BACKGROUND

Telecommunication network operators and other players in the lawful interception (LI) lifecycle, such as tenants, over-the-top (OTT) providers, need trustable, integrated, and correlated collected data regarding what is sent/received/delivered by the LI system, for supporting telecommunication network operators in all the cases where a law enforcement agency (LEA) reports missing data such as intercept related information (IRI), and/or call content (CC) data. More generally there is a need to verify if the products of an interception activity are complete and not damaged along the chain of transmission from the intercepting node, the intercept access point (IAP), to a LEA monitoring facility (LEMF).

Along with the entire interception lifecycle different systems are involved that can be owned, managed and operated by different players like network operators, law enforcement agencies as well as tenants. Even in one organization, different departments can be involved: for example, at a telecommunication network operator, one department could be responsible for the network element nodes and a different department for the LI mediation system. The number of players even increases in case of multi-operator's network sharing or in fifth generation (5G) scenarios with multi-tenants applications.

In prior art systems, the procedures of verifying the integrity and completeness of the interception activity for a specific communication session is prone to errors due to manual reconciliation from many sources and data. Moreover, prior art approaches rely on every single system logging its own data, in a way possibly vulnerable to fraud and cyber-attacks.

Figure 1:
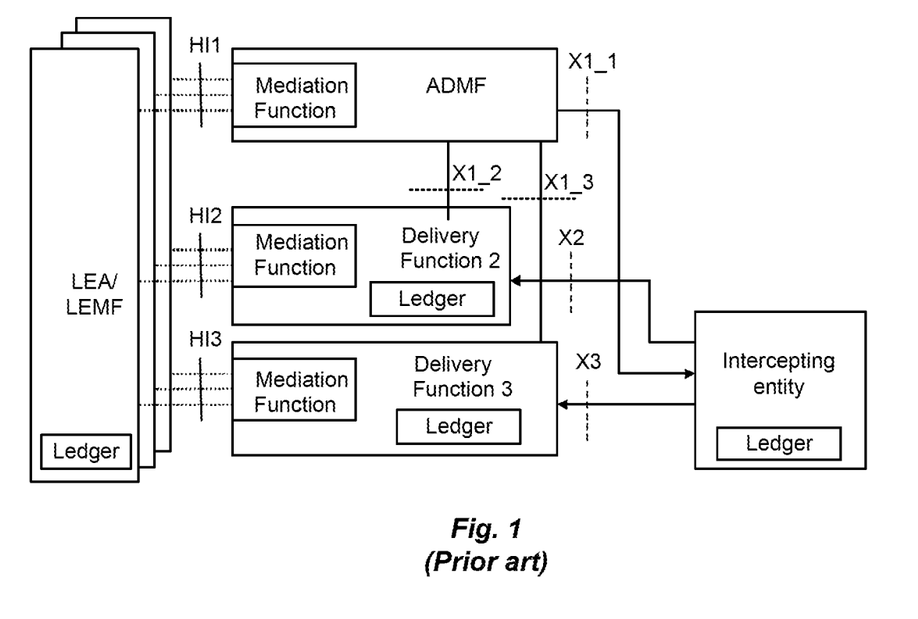
FIG. 1 illustrates a prior art LI system.

Consequently, with prior art solutions, if LI data is lost or damaged, it is difficult to settle disputes on which element in the chain of communication was responsible for the loss, as each element in the chain logs and records in their own database (ledger) information on its activities, and the other elements in the communication chain must perform an act of trust on the integrity and completeness of the recorded LI data. A prior art chain of elements of a LI system is illustrated in FIG. 1.

SUMMARY

In view of the above, an object of the present disclosure is to overcome drawbacks related to integrity of LI data. This object is achieved in a first aspect by a method of managing LI data in a telecommunication network.

The method comprises setting up a permissioned blockchain among participants. The participants comprise a LEA function, a LI mediation and delivery (MF/DF) function and an intercepting network function. A smart contract is registered in the blockchain, the smart contract comprising conditions associated with IRI and/or CC transactions performed by the participants. Registration is made in the blockchain of IRI and/or CC transactions performed by the participants during LI of a communication between two entities in the telecommunication network. The registered IRI and/or CC transactions are propagated among the participants and the smart contract is executed to verify whether or not the registered IRI and/or CC transactions are compliant with the smart contract. The participants are then informed about whether or not the registered IRI and/or CC transactions are compliant with the smart contract.

In other words, the method of the first aspect comprises actions that are performed by a plurality of communicating participants, not all of whom are entities within the telecommunication network. The conditions associated with IRI and/or CC transactions in the smart contract may comprise any of a time interval during which interception of IRI and/or CC is allowed, a check whether a number of transmitted IRI and/or CC transactions from a transmitting participant correspond to a number of received IRI and/or CC transactions in a receiving participant, and a check whether contents of transmitted IRI and/or CC transactions from a transmitting participant correspond to contents of received IRI and/or CC transactions in a receiving participant, e.g. through the verification of the registered hashed value.

In a second aspect, there is provided a method, performed by a participant, of managing LI data in a telecommunication network. Such a participant may be an intercepting control element (ICE) or a LI MF/DF function. The blockchain comprises a smart contract comprising conditions associated with IRI and/or CC transactions performed by the participant. The method comprises registration in the blockchain of IRI and/or CC transactions performed by the participant during LI of a communication between two entities in the telecommunication network. The registered IRI and/or CC transactions are propagated to other participants and the smart contract is executed to verify whether or not the registered IRI and/or CC transactions are compliant with the smart contract. The other participants are then informed about whether or not the registered IRI and/or CC transactions are compliant with the smart contract.

In a third aspect, there is provided a method, performed by a participant, of managing LI data in a telecommunication network. Such a participant may be a LEA LEMF. The method comprises setting up a permissioned blockchain among participants. The participants comprise a LEA function, a LI MF/DF function and an intercepting network function. A smart contract is registered in the blockchain, the smart contract comprising conditions associated with IRI and/or CC transactions performed by the participants. The IRI and/or CC transactions that have been registered by the participants are propagated among the participants and the smart contract is executed to verify whether or not the registered IRI and/or CC transactions are compliant with the smart contract. The participants are then informed about whether or not the registered IRI and/or CC transactions are compliant with the smart contract.

Such methods make it possible to verify the integrity of LI data transferred along the interception chain in that management of contractual relationships between different entities (operator, tenants, LEA, etc.) involved in the interception data transferring is enabled. The methods can be seen as introducing a transaction tracking mechanism among the participants that is not complex and costly, because it doesn't need intermediaries or a central point of control, as would be needed in traditional solutions.

In short, such methods overcome in an advantageous way a drawback of the prior art where no crosschecks are performed between the different databases (ledgers) in the participating elements.

In yet a further aspect there is provided a computer system comprising a plurality of server blades, each server blade comprising a processor and a memory. The memory contains instructions executable by the processor whereby the computer system is operative to perform a method as summarized above in connection with any of the first, second and third aspect.

In yet a further aspect there are provided a computer program comprising instructions which, when executed on at least one processor cause a processor to carry out a method according to any of the aspects as summarized above. In yet a further aspect there is provided a carrier comprising such a computer program, wherein the carrier is one of an electronic signal, an optical signal, a radio signal and a computer readable storage medium.

These further aspects and embodiments of these further aspects provide the same effects and advantages as summarized above in connection with the method of the first aspect.

DETAILED DESCRIPTION

Examples of management of LI data using smart contracts will now be described with reference to FIGS. 2-7. A smart contract is a computer protocol intended to digitally facilitate, verify, or enforce the negotiation or performance of a contract. Smart contracts allow the performance of credible transactions without third parties. These transactions are trackable and irreversible. Smart contracts are programmable contracts that are capable of automatically enforcing themselves when predefined conditions are met. Smart contracts can be implemented in a distributed ledger as well as a non-distributed ledger system.

Blockchains are one type of such distributed ledger systems that, when sufficiently secured, make it impossible for a single party or group of parties to reverse transactions once recorded on this database. This eliminates the need for trusted intermediaries to authenticate and settle transactions. As a result of these properties, smart contracts on distributed ledgers could have a high degree of immutability and security, guaranteeing execution based on coded terms.

A permissioned blockchain maintain an access control layer to allow certain actions to be performed only by certain identifiable participants. These blockchains differ from public as well as private blockchains. For example, public blockchain is used for Bitcoins, private blockchain is used for any internal transactions within organizations.

Figure 2A:
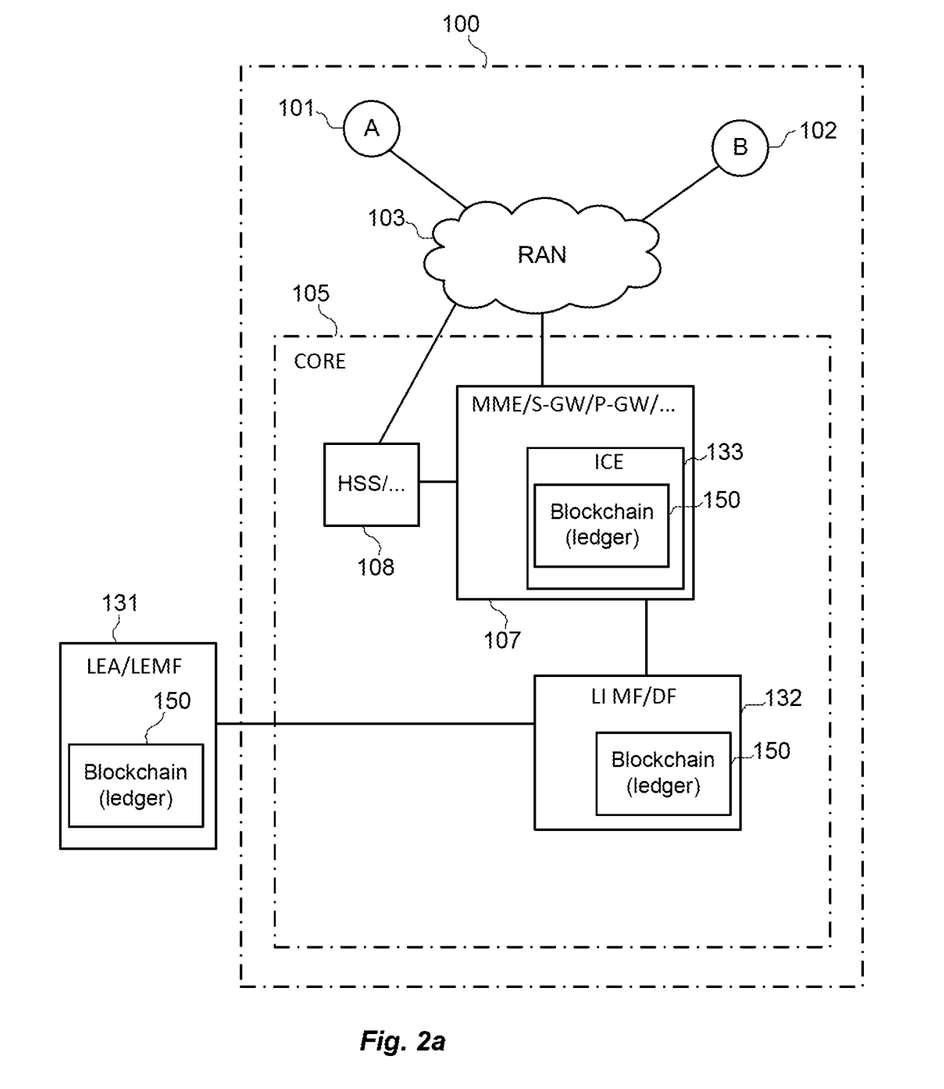
FIGS. 2a and 2b are schematically illustrated block diagrams of LI systems.

FIG. 2a schematically illustrates a first functional representation of a telecommunication network 100 comprising a core network 105 and a radio access network (RAN) 103 in which two communicating entities 101, 102 are connected. As the skilled person will realize, communication between the entities 101, 102 is enabled by several functional units in both the RAN 103 and the core network 105. For the sake of clarity of description, such functional units are schematically represented and exemplified by a functional unit 107 that may be a mobility management entity (MME), a serving gateway (S-GW), a packet data network gateway (P-GW) etc. A common characteristic of such functional units in the core network 105 is that they may comprise LI functionality in the form of an ICE 133, such as an intercept access point (IAP). Functional unit 108 represents other core network 105 functions, such as a home subscriber server (HSS), which also may comprise LI functionality, although not illustrated in FIG. 2a. The core network 105 also comprises a LI MF/DF function 132 that connects to a LEA/LEMF function 131 outside the telecommunication network 100.

Figure 2B:
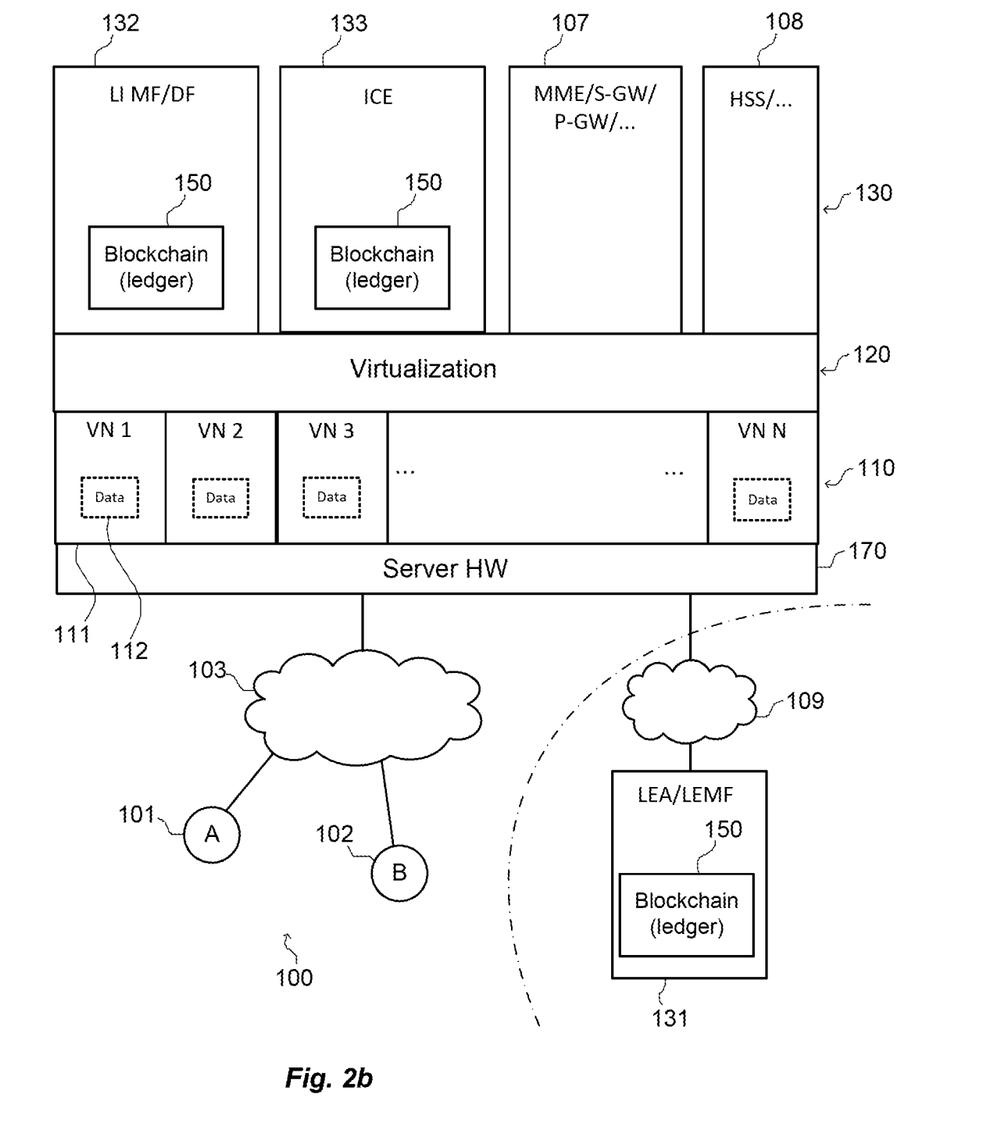

FIG. 2b schematically illustrates a second functional representation of the telecommunication network 100. In this second functional representation, the telecommunication network 100 is realized at least in part by virtualized functions that are executed on virtual nodes 110 that utilize a hardware server platform 170. The LI MF/DF function 132, the ICE 133, the MME/S-GW/P-GW 107 and the HSS 108 are realized in a functional layer 130 of virtualized network functions (VNF) that execute in the virtual nodes 110 via a virtualization layer 120. The LEA/LEMF 131 is connected to the telecommunication network 100 via an intermediate network 109, the details of which are outside the scope of the present disclosure.

The LI MF/DF function 132, the ICE 133 as well as the LEA/LEMF function 131 all comprise processing and storage resources that are configured to realize and handle a blockchain 150 as will be described in detail below.

Turning now to FIGS. 3a-d, and with continued reference to FIGS. 2a and 2b, embodiments of methods of managing LI data will be described in detail.

A first embodiment of a method of managing LI data in the telecommunication network 100 comprises a number of actions performed by the functional units introduced and described above in connection with FIG. 2a and FIG. 2b:

Action 301

Figure 3A:
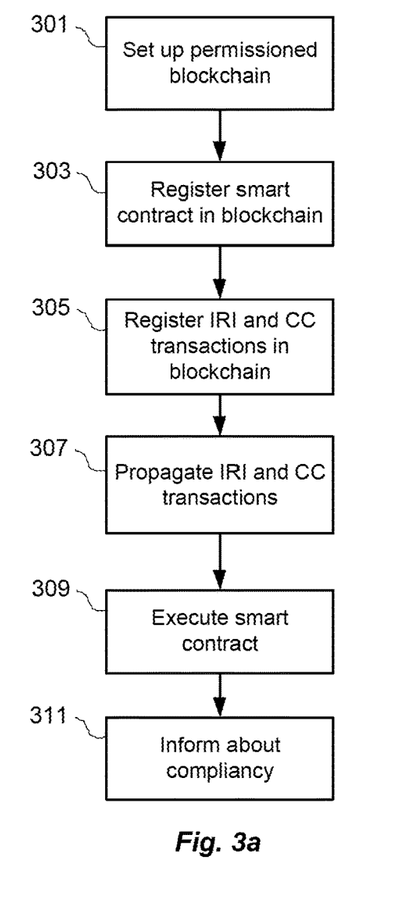
FIGS. 3a-c are flowcharts of methods,
FIG. 3d schematically illustrates a blockchain.

A permissioned blockchain 150 is set up among participants. The participants comprise the LEA function 131, the LI MF/DF function 132 and the ICE function 133. Such a set up may comprise a plurality of specific steps. However, such steps are known to the skilled person and are therefore not described in further detail herein.

Action 303

A smart contract is the registered in the blockchain 150. The smart contract comprises conditions associated with IRI and/or CC transactions performed by the participants 131, 132, 133.

Action 305

IRI and/or CC transactions performed by the participants 131, 132, 133 during LI of communication between the two entities 101, 102 in the telecommunication network 100 are registered in the blockchain 150. For example, the registering in action 305 of the IRI and/or CC transactions in the blockchain 150 may be performed subsequent to the communication between the two entities 101, 102 or subsequent to a predetermined time interval limit.

Action 307

The registered IRI and/or CC transactions are propagated among the participants 131, 132, 133.

Action 309

The smart contract is then executed to verify whether or not the registered IRI and/or CC transactions are compliant with the smart contract.

Action 311

The participants 131, 132, 133 are then informed about whether or not the registered IRI and/or CC transactions are compliant with the smart contract. For example, the action of informing may simply be that of returning a logical "fail" or "success" result from the execution action 309.

Figure 3B:
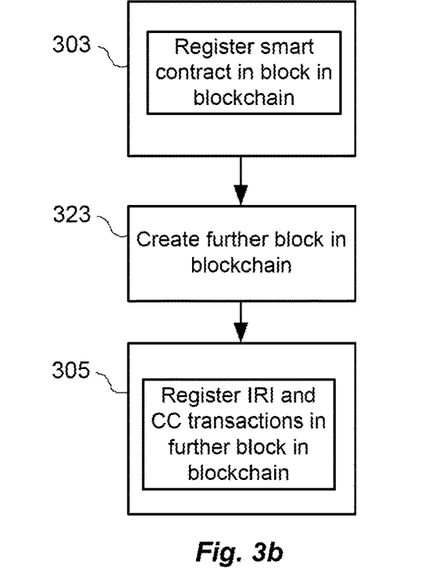
Figure 3C:
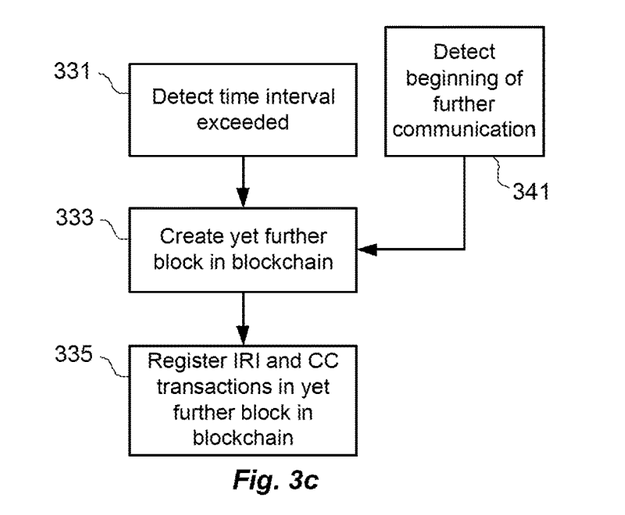
Figure 3D:
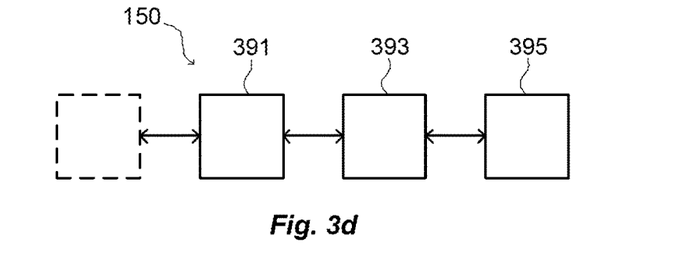

Embodiments of this method include those where the registering of a smart contract in the blockchain 150, in action 303, comprises registering the smart contract in a block 391 in the blockchain 150. Such embodiments of the method comprises the actions:

Action 323

A further block 393 is created in the blockchain 150 at the beginning of the communication between the two entities 101, 102.

Action 325

Registering, during action 305, the IRI and/or CC transactions in the further block 393 in the blockchain 150.

Some of these embodiments include those that comprise the following actions:

Action 331

A detection is made that the communication between the two entities 101, 102 has exceeded a time interval limit.

Action 333

As a consequence of the detection, in action 331, that the communication between the two entities 101, 102 has exceeded a predetermined time interval limit, yet a further block 395 is created in the blockchain 150.

Action 335

Registering, during action 305, the IRI and/or CC transactions in the yet further block 395 in the blockchain 150.

In some of these embodiments, a detection is made, in a detection action 341, that a further communication between the two entities 101, 102 begins. As a consequence of this detection, action 333 and 335 are performed.

From a perspective of a single participant, such as the LI MF/DF 132 or the ICE133, a method of managing LI data in the telecommunication network 100 comprises the following actions. In these embodiments, a prerequisite is the existence of the blockchain 150 comprising a smart contract comprising conditions associated with IRI and/or CC transactions performed by the participant 132, 133. Other participants include the LEA function 131.

Action 305

IRI and/or CC transactions performed by the participant 132, 133 during LI of communication between the two entities 101, 102 in the telecommunication network 100 are registered in the blockchain 150. For example, the registering in action 305 of the IRI and/or CC transactions in the blockchain 150 may performed subsequent to the communication between the two entities 101, 102 or subsequent to a predetermined time interval limit.

Action 307

The registered IRI and/or CC transactions are propagated to other participants 131, 132, 133.

Action 309

The smart contract is then executed to verify whether or not the registered IRI and/or CC transactions are compliant with the smart contract.

Action 311

The other participants 131, 132, 133 are then informed about whether or not the registered IRI and/or CC transactions are compliant with the smart contract.

Embodiments of this method include those where the smart contract is registered in a block 391 in the blockchain 150. Such embodiments comprises the actions:

Action 323

A further block 393 is created in the blockchain 150 at the beginning of the communication between the two entities 101, 102.

Action 325

Registering, during action 305, the IRI and/or CC transactions in the further block 393 in the blockchain 150.

Some of these embodiments include those that comprise the following actions:

Action 331

A detection is made that the communication between the two entities 101, 102 has exceeded a time interval limit.

Action 333

As a consequence of the detection, in action 331, that the communication between the two entities 101, 102 has exceeded a predetermined time interval limit, yet a further block 395 is created in the blockchain 150.

Action 335

Registering, during action 305, the IRI and/or CC transactions in the yet further block 395 in the blockchain 150.

In some of these embodiments, a detection is made, in a detection action 341, that a further communication between the two entities 101, 102 begins. As a consequence of this detection, action 333 and 335 are performed.

From a perspective of another single participant, such as a LEA function in the form of the LEMF 131, a method of managing LI data in the telecommunication network 100 comprises the following actions.

Action 301

A permissioned blockchain 150 is set up among participants. The participants comprise the LEA function 131, the LI MF/DF function 132 and the ICE function 133. Such a set up may comprise a plurality of specific steps. However, such steps are known to the skilled person and are therefore not described in further detail herein.

Action 303

A smart contract is the registered in the blockchain 150. The smart contract comprises conditions associated with IRI and/or CC transactions performed by the participants 131, 132, 133.

Action 307

Registered IRI and/or CC transactions are propagated to the other participants 132, 133.

Action 309

The smart contract is then executed to verify whether or not the registered IRI and/or CC transactions are compliant with the smart contract.

Action 311

The other participants 132, 133 are then informed about whether or not the registered IRI and/or CC transactions are compliant with the smart contract.

Figure 4A:
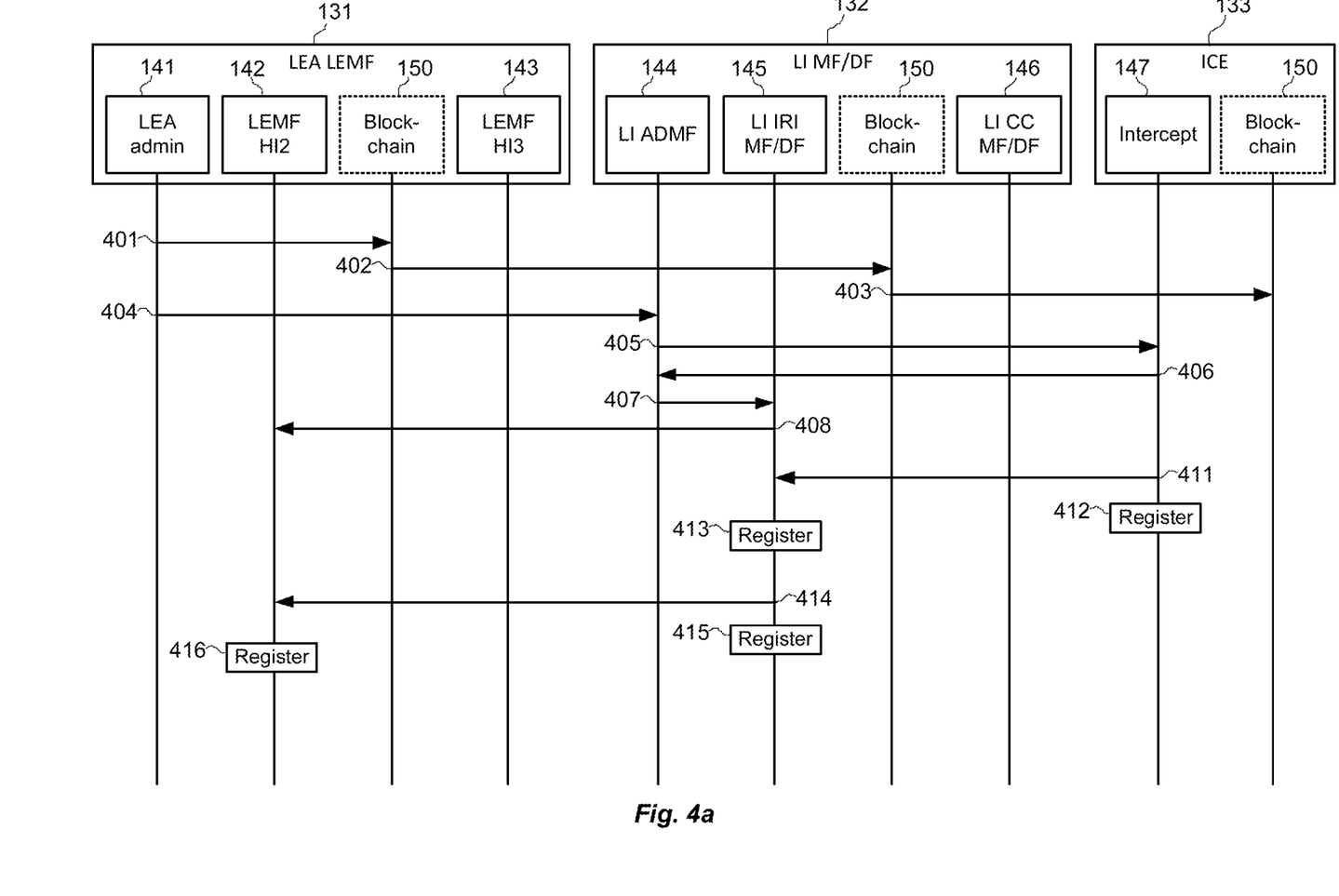
FIGS. 4a-c are signaling diagrams.
Figure 4B:
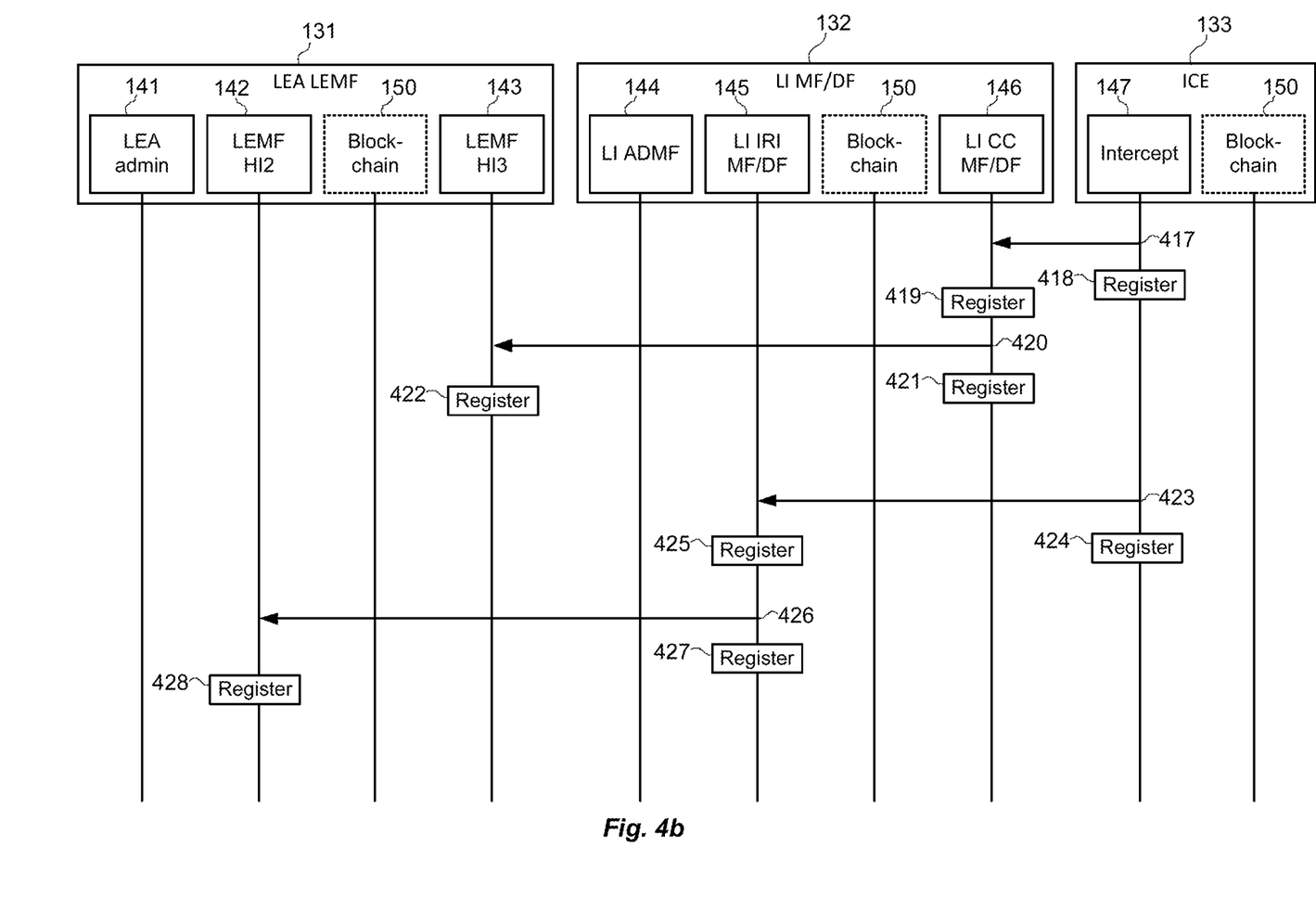
Figure 4C:
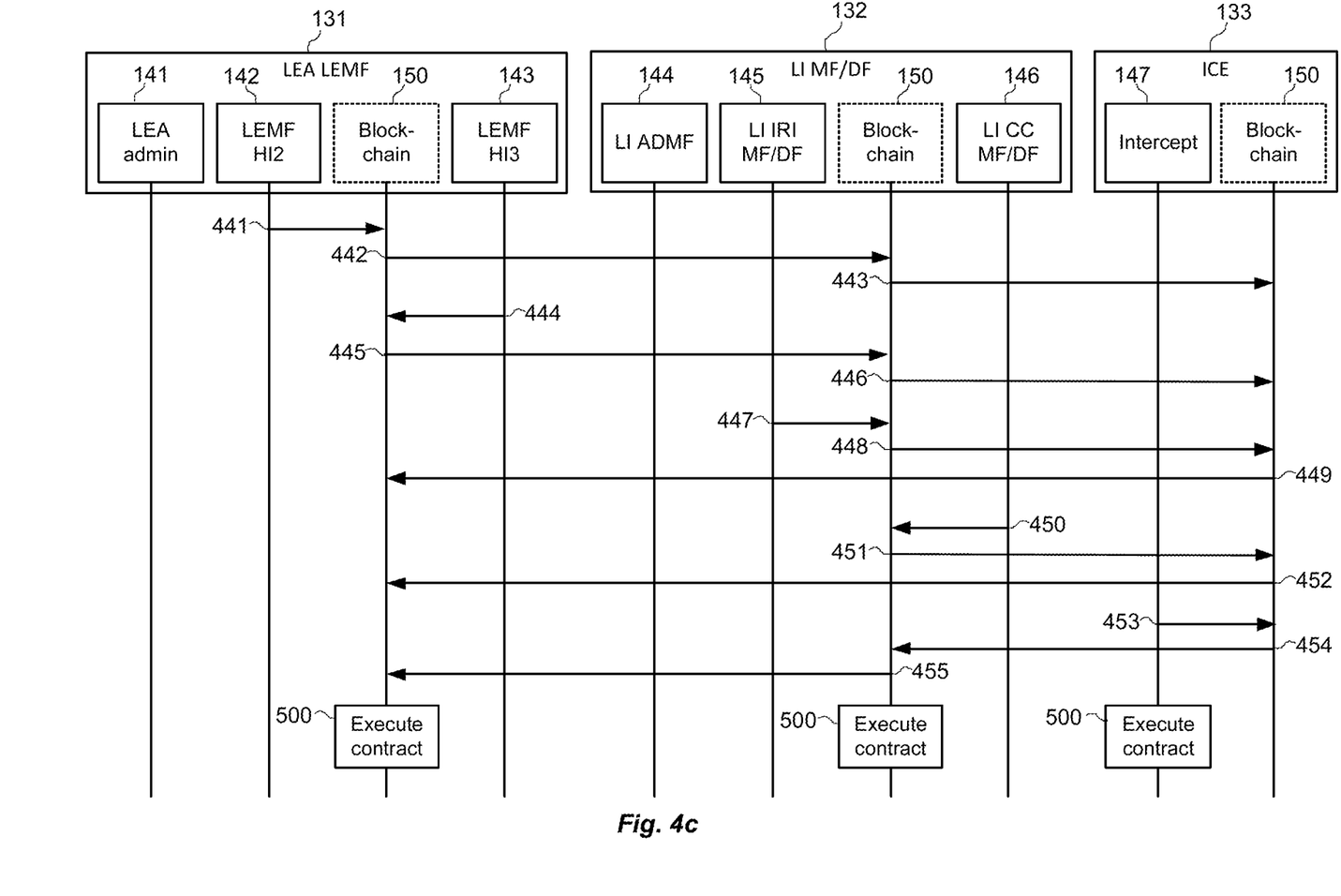

Turning now to the signalling diagrams in FIGS. 4*a-c*, and with continued reference to FIGS. 2*a-b* and FIGS. 3*a-d*, a more detailed example will be described. The LEA function 131 comprises a LEA administrative function (LEA admin) 141, a HI2 delivery function (LEMF HI2) 142, a HI3 delivery function (LEMF HI3) 143 and the blockchain 150. The LI MF/DF function 132 comprises an administrative function (ADMF) 144, an IRI MF/DF function 145, a CC MF/DF function 146 and the blockchain 150. The ICE 133 comprises an intercept function 147 and the blockchain 150.

The example commences with a registration of a smart contract for a new LI interception of a specific target identity (target ID). The smart contract, which will be exemplified in detail below in connection with FIG. 5, has been created as a consequence of a LI warrant submission to the LEA administrative function 141.

The LEA administrative function 141 then registers the smart contract in the blockchain as illustrated by signals 401, 402 and 403.

The LEA administrative function 141 then activates LI on the target ID as illustrated by signal 404 to the LI ADMF 144.

The LI ADMF 144 then instructs the intercept function 147 to activate LI on the target ID, the intercept function 147 confirms to the LI ADMF 144 as illustrated by signals 405, 406.

The LI ADMF 144 notifies the LI IRI MF/DF 145 about the activation and the LI IRI MF/DF 145 notifies the LEMF HI2 142 as illustrated by signals 407, 408.

Communication is then started by the target ID and LI starts where IRI and CC are captured by the intercepting function 147.

The intercepting function 147 sends IRI for the target ID to the IRI MF/DF 145 as illustrated by signal 411, and registers the sending of the IRI (i.e. an IRI transaction as used in the examples above) locally as illustrated by register action 412.

The IRI MF/DF 145 registers locally the reception of IRI from the intercepting function 147 as illustrated by register action 413. The IRI MF/DF then sends mediated IRI for the target ID to the LEMF HI2 142 and registers the sending locally, as illustrated by signal 414 and register action 415.

The LEMF HI2 142 registers the reception of the mediated IRI from the IRI MF/DF 145 locally as illustrated by register action 416.

The intercepting function 147 sends CC for the target ID to the CC MF/DF 146 as illustrated by signal 417, and registers the sending of the CC (i.e. an CC transaction as used in the examples above) locally as illustrated by register action 418.

The CC MF/DF 146 registers locally the reception of CC from the intercepting function 147 as illustrated by register action 419. The CC MF/DF then sends mediated CC for the target ID to the LEMF HI3 143 and registers the sending locally, as illustrated by signal 420 and register action 421.

The LEMF HI3 143 registers the reception of the mediated CC from the CC MF/DF 146 locally as illustrated by register action 422.

The intercepting function 147 sends a last IRI for the target ID to the IRI MF/DF 145 as illustrated by signal 423, and registers the sending of the last IRI locally as illustrated by register action 424.

The IRI MF/DF 145 registers locally the reception of last IRI from the intercepting function 147 as illustrated by register action 425. The IRI MF/DF then sends mediated last IRI for the target ID to the LEMF HI2 142 and registers the sending locally, as illustrated by signal 426 and register action 427.

The LEMF HI2 142 registers the reception of the mediated last IRI from the IRI MF/DF 145 locally as illustrated by register action 428.

The communication by the target ID finishes and all LI data that has been registered locally by the participants, as described above, are logged in the blockchain 150 and the blockchain 150 is propagated as follows. Needless to say, the order in which the registrations and propagations are performed is not essential.

The LEMF HI2 142 registers the locally stored IRI transactions in the blockchain 150 as illustrated by signal 441, and propagation of the transaction in the blockchain 150 to the other participants (i.e. the MF/DF 132 and the ICE 133) takes place as illustrated by signals 442 and 443.

The LEMF HI3 142 registers the locally stored CC transactions in the blockchain 150 as illustrated by signal 444, and propagation of transaction in the blockchain 150 to the other participants (i.e. the MF/DF 132 and the ICE 133) takes place as illustrated by signals 445 and 446.

The IRI MF/DF 145 registers the locally stored IRI transactions in the blockchain 150 as illustrated by signal 447, and propagation of transaction in the blockchain 150 to the other participants (i.e. the LEA/LEMF 131 and the ICE 133) takes place as illustrated by signals 448 and 449.

The CC MF/DF 146 registers the locally stored CC transactions in the blockchain 150 as illustrated by signal 450, and propagation of the transaction in the blockchain 150 to the other participants (i.e. the LEA/LEMF 131 and the ICE 133) takes place as illustrated by signals 451 and 452.

The interception function 147 registers the locally stored IRI and CC transactions in the blockchain 150 as illustrated by signal 453, and propagation of the transaction in the blockchain 150 to the other participants (i.e. the LEA/LEMF 131 and the MF/DF 132) takes place as illustrated by signals 454 and 455.

Having logged the LI data in the blockchain 150, the blockchain now comprises, e.g., LI data as follows:

LI data registered by the intercepting function 147 comprises the following information about IRI and CC sent to the MF/DF 132: the node identifier (unique identity of the network element), the communication Identifier (CIN) (unique identifier for the communication session), the reference to the warrant on the target, numbers of IRI and CC sent, the size in bytes of sent CC, and hashed values of sent IRI's and hash of the ordered sequence of sent CC packets hashes.

LI data registered by the IRI MF/DF 145 and the CC MF/DF 146 comprises the following information about IRI and CC received from the interception function 147: the mediation identifier (unique identifier of the mediation system), the node identifier, the CIN, the LIID (warrant identifier as named by the LEA) of the warrants on the target, numbers of IRI and CC received, the size in bytes of received CC and hashed values of received IRI's and hash of the ordered sequence of received CC packets hashes.

LI data registered by the IRI MF/DF 145 and the CC MF/DF 146 comprises the following information about IRI and CC sent to each LEMF HI2 142 and LEMF HI3 143: the mediation identifier, the HI2 LEMF identifier, the HI3 LEMF identifier, the CIN, the LIID of the warrant on the target by the LEA, numbers of IRI and CC sent to the LEMF, the size in bytes of sent CC and hashed values of sent IRI's and hash of the ordered sequence of sent CC packets hashes.

LI data registered by the LEMF HI2 142 and the LEMF HI3 143 comprises the following information for the received IRI and CC: the mediation identifier, the HI2 LEMF identifier, the HI3 LEMF identifier, the CIN, the LIID of the warrant on the target by the LEA, numbers of IRI and CC received by the LEMF, the size in bytes of received CC and hashed values of received IRI's and hash of the ordered sequence of received CC packets hashes.

Figure 5:
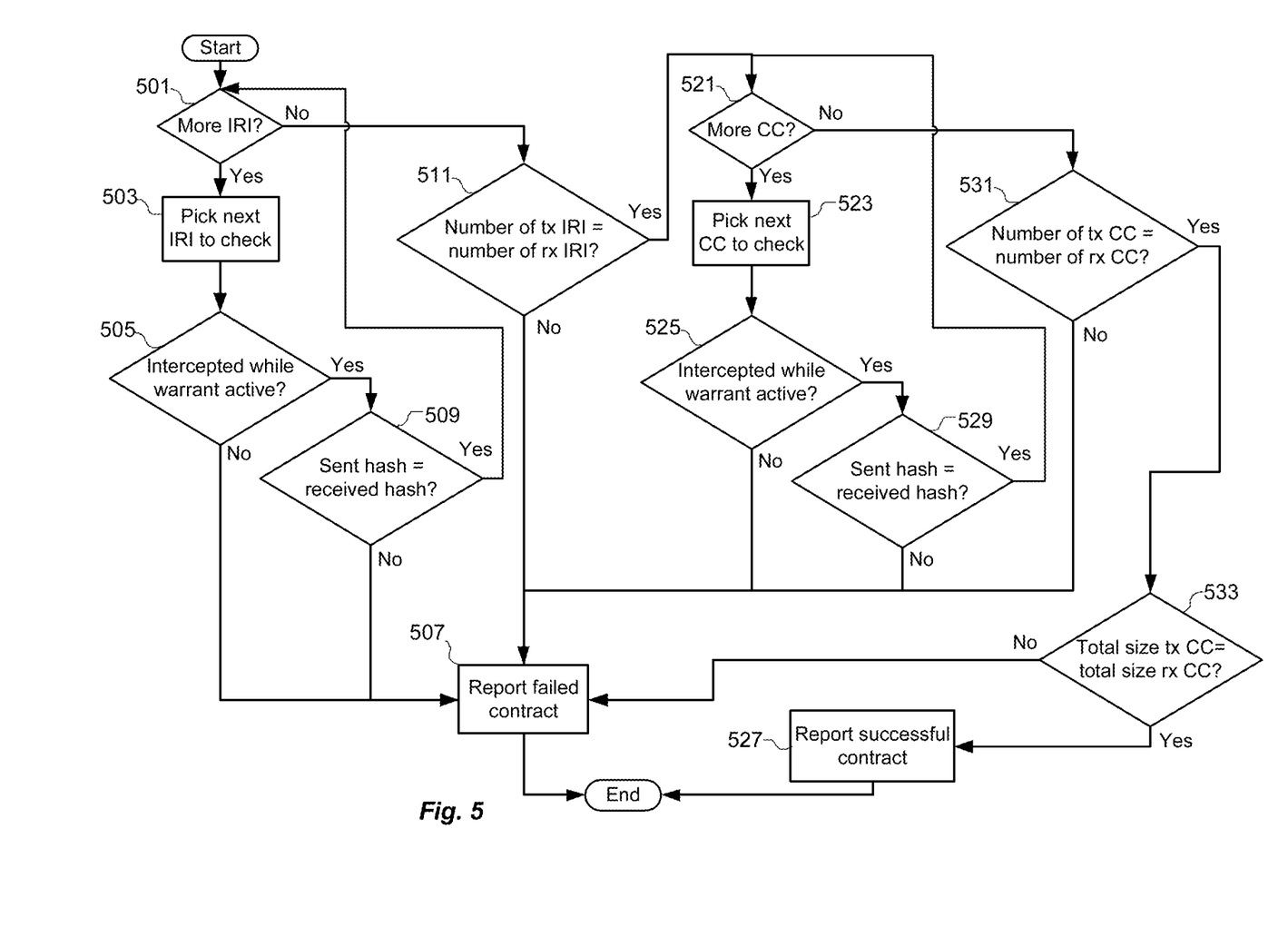
FIG. 5 is a flowchart of a method,
FIG. 6 schematically illustrates a computer system, and
FIG. 7 schematically illustrates a computer system.

The smart contract is then executed by the participants 131, 132, 133. The smart contract comprises conditions associated with IRI and/or CC transactions, such as any of a time interval during which interception of IRI and/or CC is allowed, a check whether a number of transmitted IRI and/or CC transactions from a transmitting participant correspond to a number of received IRI and/or CC transactions in a receiving participant, and a check whether contents of transmitted IRI and/or CC transactions from a transmitting participant correspond to contents of received IRI and/or CC transactions in a receiving participant, e.g. through the verification of the registered hashed value. An example of such execution of the smart contract for the link between two participants, e.g. the MF/DF 132 and the ICE 133, is illustrated by a flowchart of actions in FIG. 5 together with the following pseudo code:

| Action | Pseudo code |
| --- | --- |
| 501 | for each IRItransaction in the Step |
| 505 | if NOT (Warrant.startTime <= IRItransaction.Time <= Warrant.stopTime) |
|  | then |
| 507 | Contract.verification := Failure |
|  | /* interception of IRI has been performed |
|  | /* outside of authorized period |
|  | return |
|  | else |
| 509 | if there's no IRIsent.hash = IRIreceived.hash |
|  | then |
| 507 | Contract.verification := Failure |
|  | /* for every IRI sent there must be a |
|  | /* received IRI with the same hash |
|  | return |
|  | end if |
|  | end If |
| 503 | end for |
| 511 | if IRIsent.number <> IRIreceived.number |
|  | then |
| 507 | Contract.verification := Failure |
|  | /* the number of IRI sent are different from |
|  | /* the number of IRI received |
|  | return |
|  | end if |
| 521 | for each CCtransaction in the Step |
| 525 | if NOT (Warrant.startTime <= CCtransaction.Time <= Warrant.stopTime) |
|  | then |
| 507 | Contract.verification := Failure |
|  | /* interception of CC has been performed outside |
|  | /* of authorized period |
|  | return |
|  | else |
| 529 | if there's no CCblockSent.hash=CCblockReceived.hash |
|  | then |
| 507 | Contract.verification := Failure |
|  | /* for every block of CC sent there must be a |
|  | /* received block of CC with the same hash |
|  | return |
|  | end if |
|  | end If |
| 523 | end for |
| 531 | if CCsent.number <> CCreceived.number |
|  | then |
| 507 | Contract.verification := Failure |
|  | /* the number of CC packets sent are different |
|  | /* from the number of received ones |
|  | return |
|  | end if |
| 533 | if CCsent.size <> CCreceived.size |
|  | then |
| 507 | Contract.verification := Failure |
|  | /* the total size of CC packets sent are different |
|  | /* from the size of received ones |
|  | return |
|  | end if |
| 527 | Contract.verification := Success |

Needless to say, the example of FIG. 5 is far from comprehensive; it does not include such cases as IRI/CC failure deliveries, discarded IRI/CC. For such cases the different participants will register IRI/CC transactions with such information and the blockchain 150 can verify the congruency of the collected data from different entities for the same transaction.

Figure 6:
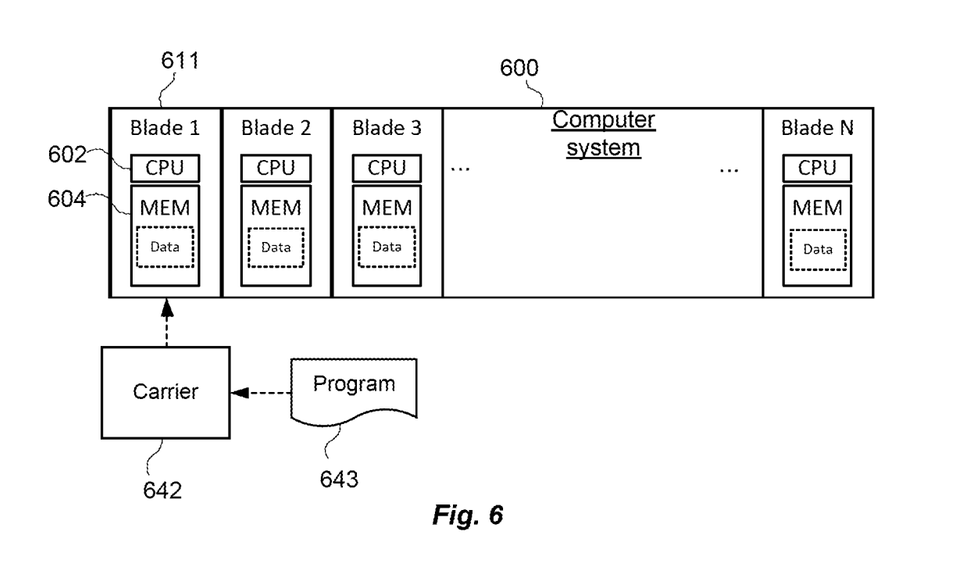

Turning now to FIG. 6, and with continued reference to FIGS. 2a-b, 3a-d, 4a-c and FIG. 5, a computer system 600 will be described in some detail. The computer system 600, which may correspond to at least part of the telecommunication network 100, comprises a plurality of server blades 611 that comprise a processor 602 and a memory 604. The memory 604 contains instructions executable by the processor 602 whereby the computer system 600 is operative to:

set up a permissioned blockchain 150 among participants, said participants comprising a law enforcement agency, LEA, function 131, a LI mediation and delivery, MF/DF, function 132, and a intercepting network function 133, register a smart contract in the blockchain 150, said smart contract comprising conditions associated with intercept related information, IRI, and/or call content, CC, transactions performed by the participants 131, 132, 133, register, in the blockchain 150, IRI and/or CC transactions performed by the participants 131, 132, 133 during LI of communication between two entities 101, 102 in the telecommunication network 100, propagate the registered IRI and/or CC transactions among the participants 131, 132, 133, execute the smart contract to verify whether or not the registered IRI and/or CC transactions are compliant with the smart contract, and inform the participants 131, 132, 133 about whether or not the registered IRI and/or CC transactions are compliant with the smart contract.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In some embodiments, the computer system 600 is operative such that the registering of the IRI and/or CC transactions in the blockchain 150 is performed subsequent to the communication between the two entities 101, 102 or subsequent to a predetermined time interval limit.

In some embodiments, the computer system 600 is operative such that the registering a smart contract in the blockchain 150 comprises registering the smart contract in a block 391 in the blockchain 150, and operative to:

create, at the beginning of the communication between the two entities 101, 102, a further block 393 in the blockchain 150, and operative such that the registering of the IRI and/or CC transactions comprises:

registering the IRI and/or CC transactions in the further block 393 in the blockchain 150.

In some embodiments, the computer system 600 is operative to:

detect that the communication between the two entities 101, 102 has exceeded a time interval limit, create, as a consequence of the detection that the communication between the two entities 101, 102 has exceeded a predetermined time interval limit, yet a further block 395 in the blockchain 150, and operative such that the registering 305 of the IRI and/or CC transactions comprises:

registering the IRI and/or CC transactions in said yet further block 395 in the blockchain 150.

In some embodiments, the computer system 600 is operative to:

detect that a further communication between the two entities 101, 102 begins, create, as a consequence of the detection that a further communication between the two entities 101, 102 begins, yet a further block 395 in the blockchain 150, and operative such that the registering of the IRI and/or CC transactions comprises:
  registering the IRI and/or CC transactions in said yet further block 395 in the blockchain 150.

Continuing with reference to FIG. 6, and with continued reference to FIGS. 2a-b, 3a-d, 4a-c and FIG. 5, a computer system 600 will be described in some detail. The computer system 600, which may correspond to at least part of the telecommunication network 100, comprises a plurality of server blades 611 that comprise a processor 602 and a memory 604. The memory 604 contains instructions executable by the processor 602 whereby the computer system 600 is operative to:
  register, in a blockchain 150, IRI and/or CC, transactions during LI of communication between two entities 101, 102 in the telecommunication network 100,
  propagate the registered IRI and/or CC transactions to participants 131, 132, 133 of,
  execute a smart contract to verify whether or not the registered IRI and/or CC transactions are compliant with the smart contract, and
  inform participants 131, 132, 133 about whether or not the registered IRI and/or CC transactions are compliant with the smart contract.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In some embodiments, the computer system 600 is operative such that the registering of the IRI and/or CC transactions in the blockchain 150 is performed subsequent to the communication between the two entities 101, 102 or subsequent to a predetermined time interval limit.

In some embodiments, the computer system 600 is operative such that the smart contract is registered in a block 391 in the blockchain 150, and operative to:
  create, at the beginning of the communication between the two entities 101, 102, a further block 393 in the blockchain 150, and operative such that the registering of the IRI and/or CC transactions comprises:
  registering the IRI and/or CC transactions in the further block 393 in the blockchain 150.

In some embodiments, the computer system 600 is operative to:
  detect that the communication between the two entities 101, 102 has exceeded a time interval limit,
  create, as a consequence of the detection that the communication between the two entities 101, 102 has exceeded a predetermined time interval limit, yet a further block 395 in the blockchain 150, and operative such that the registering of the IRI and/or CC transactions comprises:
  registering the IRI and/or CC transactions in said yet further block 395 in the blockchain 150.

In some embodiments, the computer system 600 is operative to:
  detect that a further communication between the two entities 101, 102 begins,
  create, as a consequence of the detection that a further communication between the two entities 101, 102 begins, yet a further block 395 in the blockchain 150, and operative such that the registering of the IRI and/or CC transactions comprises:
  registering the IRI and/or CC transactions in said yet further block 395 in the blockchain 150.

In some embodiments, the computer system 600 is operative to be any of an intercepting control element, ICE, and a LI mediation and delivery function, MF/DF.

Continuing with reference to FIG. 6, and with continued reference to FIGS. 2a-b, 3a-d, 4a-c and FIG. 5, a computer system 600 will be described in some detail. The computer system 600 comprises a plurality of server blades 611 that comprise a processor 602 and a memory 604. The memory 604 contains instructions executable by the processor 602 whereby the computer system 600 is operative to:
  set up a permissioned blockchain 150 among participants, said participants comprising a law enforcement agency, LEA, function 131, a LI mediation and delivery function, MF/DF, 132, and a intercepting network function 133,
  register a smart contract in the blockchain 150, said smart contract comprising conditions associated with intercept related information, IRI, and/or call content, CC, transactions performed by the participants 131, 132, 133,
  propagate registered IRI and/or CC transactions to other participants 132, 133,
  execute the smart contract to verify whether or not the registered IRI and/or CC transactions are compliant with the smart contract, and
  inform participants 132, 133 about whether or not the registered IRI and/or CC transactions are compliant with the smart contract.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In some embodiments, the computer system 600 is operative to be a LEA monitoring facility, LEMF.

Figure 7:
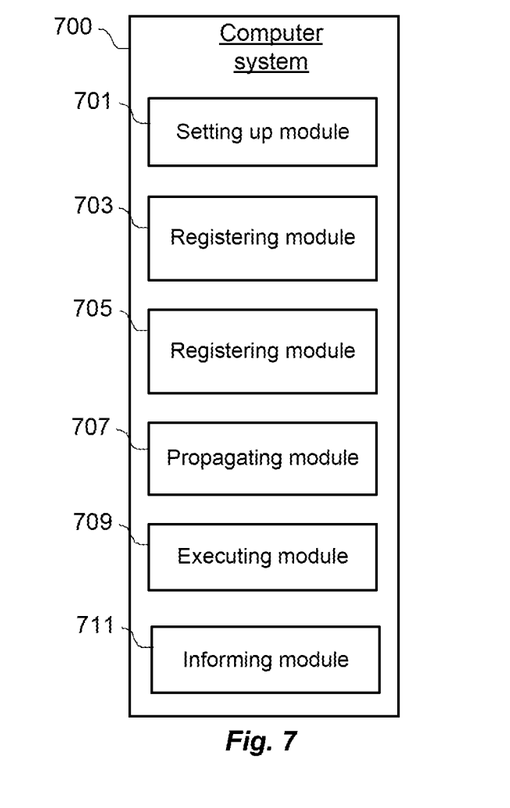

Turning now to FIG. 7, and with continued reference to FIGS. 2a-b, 3a-d, 4a-c and FIG. 5, a computer system 700 will be described in some detail. The computer system 700 comprises:
  a setting up module 701 configured to set up a permissioned blockchain 150 among participants, said participants comprising a law enforcement agency, LEA, function 131, a LI mediation and delivery, MF/DF, function 132, and a intercepting network function 133,
  a registering module 703 configured to register a smart contract in the blockchain 150, said smart contract comprising conditions associated with intercept related information, IRI, and/or call content, CC, transactions performed by the participants 131, 132, 133,
  a registering module 705 configured to register, in the blockchain 150, IRI and/or CC transactions performed by the participants 131, 132, 133 during LI of communication between two entities 101, 102 in the telecommunication network 100,
  a propagating module 707 configured to propagate the registered IRI and/or CC transactions among the participants 131, 132, 133, an executing module 709 configured to execute the smart contract to verify whether or not the registered IRI and/or CC transactions are compliant with the smart contract, and an informing module 711 configured to inform the participants 131, 132, 133 about whether or not the registered IRI and/or CC transactions are compliant with the smart contract.

The computer system 700 may comprise further modules that are configured to perform in a similar manner as, e.g., the computer system 600 described above in connection with FIG. 6.

The invention claimed is:

1. A method of managing lawful interception, LI, data in a telecommunication network, the method comprising:
    setting up a permissioned blockchain among participants, said participants comprising a law enforcement agency, LEA, function, a LI mediation and delivery function, MF/DF, and a intercepting network function,
    registering a smart contract in the blockchain, said smart contract comprising conditions associated with at least one of intercept related information, IRI, and call content, CC, transactions performed by the participants,
    registering, in the blockchain, at least one of IRI and CC transactions performed by the participants during LI of communication between two entities in the telecommunication network,
    propagating at least one of the registered IRI and CC transactions among the participants,
    executing the smart contract to verify whether or not at least one of the registered IRI and CC transactions are compliant with the smart contract, and
    informing the participants about whether or not at least one of the registered IRI and CC transactions are compliant with the smart contract.

2. The method of claim 1, wherein the registering at least one of the IRI and CC transactions in the blockchain is performed subsequent to the communication between the two entities or subsequent to a predetermined time interval limit.

3. The method of claim 1, wherein the registering a smart contract in the blockchain comprises registering the smart contract in a block in the blockchain, and wherein the method comprises:
    creating, at the beginning of the communication between the two entities, a further block in the blockchain, and
wherein the registering at least one of the IRI and CC transactions comprises:
    registering at least one of the IRI and CC transactions in the further block in the blockchain.

4. The method of claim 3, comprising:
    detecting that the communication between the two entities has exceeded a time interval limit,
    creating, as a consequence of the detection that the communication between the two entities has exceeded a predetermined time interval limit, yet a further block in the blockchain, and
wherein the registering at least one of the IRI and CC transactions comprises:
    registering at least one of the IRI and/or CC transactions in said yet further block in the blockchain.

5. The method of claim 3, comprising:
    detecting that a further communication between the two entities begins,
    creating, as a consequence of the detection that a further communication between the two entities begins, yet a further block in the blockchain, and
wherein the registering at least one of the IRI and CC transactions comprises:
    registering at least one of the IRI and CC transactions in said yet further block in the blockchain.

6. A method, performed by a participant, of managing lawful interception, LI, data in a telecommunication network, the blockchain comprising a smart contract comprising conditions associated with at least one of intercept related information, IRI, and call content, CC, transactions performed by the participant, the method comprising:
    registering, in the blockchain, at least one of IRI and CC, transactions performed by the participant during LI of communication between two entities in the telecommunication network,
    propagating at least one of the registered IRI and CC transactions to other participants,
    executing the smart contract to verify whether or not at least one of the registered IRI and CC transactions are compliant with the smart contract, and
    informing other participants about whether or not at least one of the registered IRI and CC transactions are compliant with the smart contract.

7. The method of claim 6, wherein the registering of at least one of the IRI and CC transactions in the blockchain is performed subsequent to the communication between the two entities or subsequent to a predetermined time interval limit.

8. The method of claim 6, wherein the smart contract is registered in a block in the blockchain, and wherein the method comprises:
    creating, at the beginning of the communication between the two entities, a further block in the blockchain, and
wherein the registering of at least one of the IRI and CC transactions comprises:
    registering at least one of the IRI and CC transactions in the further block in the blockchain.

9. The method of claim 8, comprising:
    detecting that the communication between the two entities has exceeded a time interval limit,
    creating, as a consequence of the detection that the communication between the two entities has exceeded a predetermined time interval limit, yet a further block in the blockchain, and
wherein the registering of at least one of the IRI and CC transactions comprises:
    registering at least one of the IRI CC transactions in said yet further block in the blockchain.

10. The method of claim 8, comprising:
    detecting that a further communication between the two entities begins,
    creating, as a consequence of the detection that a further communication between the two entities begins, yet a further block in the blockchain, and
wherein the registering of at least one of the IRI and CC transactions comprises:
    registering at least one of the IRI and CC transactions in said yet further block in the blockchain.

11. The method of claim 6, where the participant is any of:
    an intercepting control element, ICE, and
    a LI mediation and delivery function, MF/DF.

12. A method, performed by a participant, of managing lawful interception, LI, data in a telecommunication network, the method comprising:

setting up a permissioned blockchain among participants, said participants comprising a law enforcement agency, LEA, function, a LI mediation and delivery function, MF/DF, and a intercepting network function, registering a smart contract in the blockchain, said smart contract comprising conditions associated with at least one of intercept related information, IRI, and call content, CC, transactions performed by the participants, propagating at least one of registered IRI and CC transactions to other participants, executing the smart contract to verify whether or not at least one of the registered IRI and CC transactions are compliant with the smart contract, and informing other participants about whether or not at least one of the registered IRI and CC transactions are compliant with the smart contract.

13. The method of claim 12, where the participant is a LEA monitoring facility, LEMF.

14. The method of claim 12, wherein the conditions associated with at least one of IRI and CC transactions in the smart contract comprise any of:

a time interval during which interception of at least one of IRI and CC is allowed, a check whether at least one of a number of transmitted IRI and CC transactions from a transmitting participant correspond to at least one of a number of received IRI and CC transactions in a receiving participant, and a check whether contents of at least one of transmitted IRI and CC transactions from a transmitting participant correspond to contents of at least one of received IRI and CC transactions in a receiving participant.

15. A computer system comprising a plurality of server blades, each server blade comprising a processor and a memory, said memory containing instructions executable by said processor whereby said computer system is operative to perform a method according to claim 1.

16. The method of claim 1, wherein the conditions associated with at least one of IRI and CC transactions in the smart contract comprise any of:

a time interval during which interception at least one of IRI and CC is allowed, a check whether at least one of a number of transmitted IRI and CC transactions from a transmitting participant correspond to at least one of a number of received IRI and CC transactions in a receiving participant, and a check whether contents of at least one of transmitted IRI and CC transactions from a transmitting participant correspond to at least one of contents of received IRI and CC transactions in a receiving participant.

17. The method of claim 6, wherein the conditions associated with at least one of IRI and CC transactions in the smart contract comprise any of:

a time interval during which interception of at least one of IRI and CC is allowed, a check whether at least one of a number of transmitted IRI and/or CC transactions from a transmitting participant correspond to at least one of a number of received IRI and CC transactions in a receiving participant, and a check whether at least one of contents of transmitted IRI and CC transactions from a transmitting participant correspond to at least one of contents of received IRI and CC transactions in a receiving participant.

* * * * *